Feb. 17, 1925.
G. H. OSGOOD
VENEER CLIPPER
Filed Aug. 5, 1922
1,527,064
8 Sheets-Sheet 1
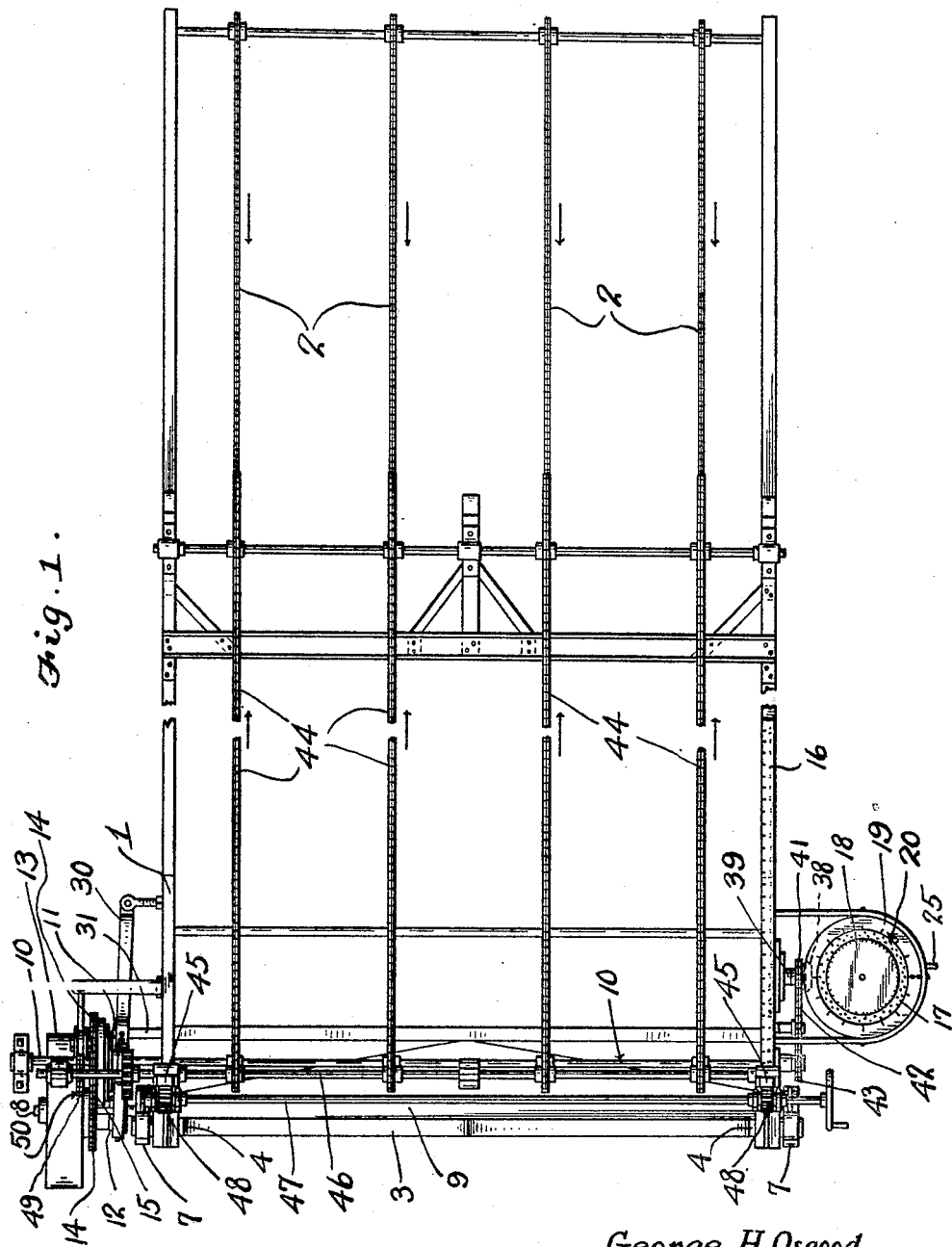
George H. Osgood, INVENTOR
BY Victor J. Evans
WITNESS:
ATTORNEY Feb. 17, 1925.
G. H. OSGOOD
VENEER CLIPPER
Filed Aug. 5, 1922
1,527,064
8 Sheets-Sheet 2
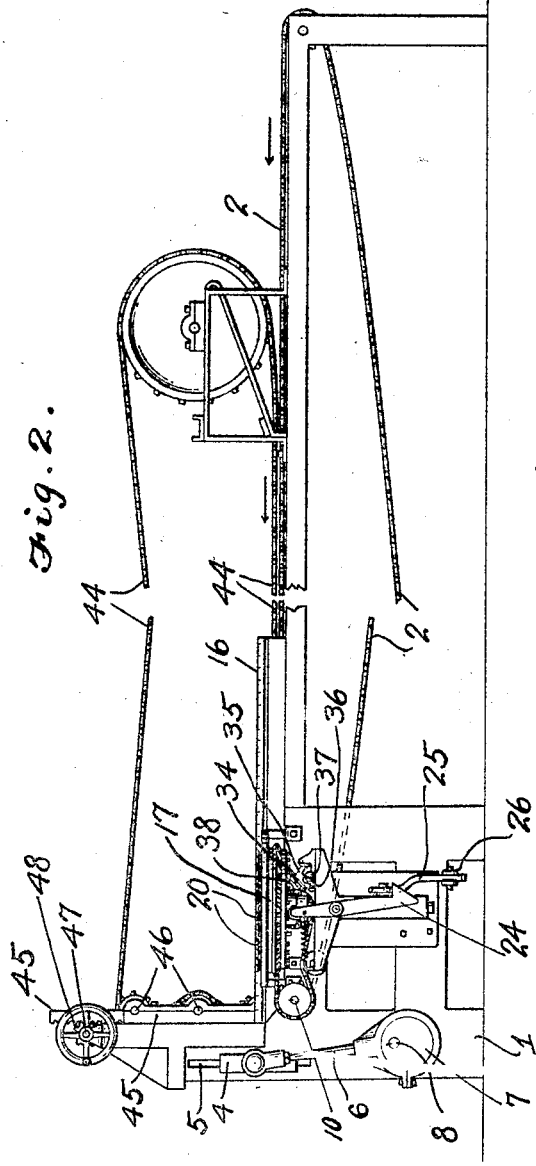
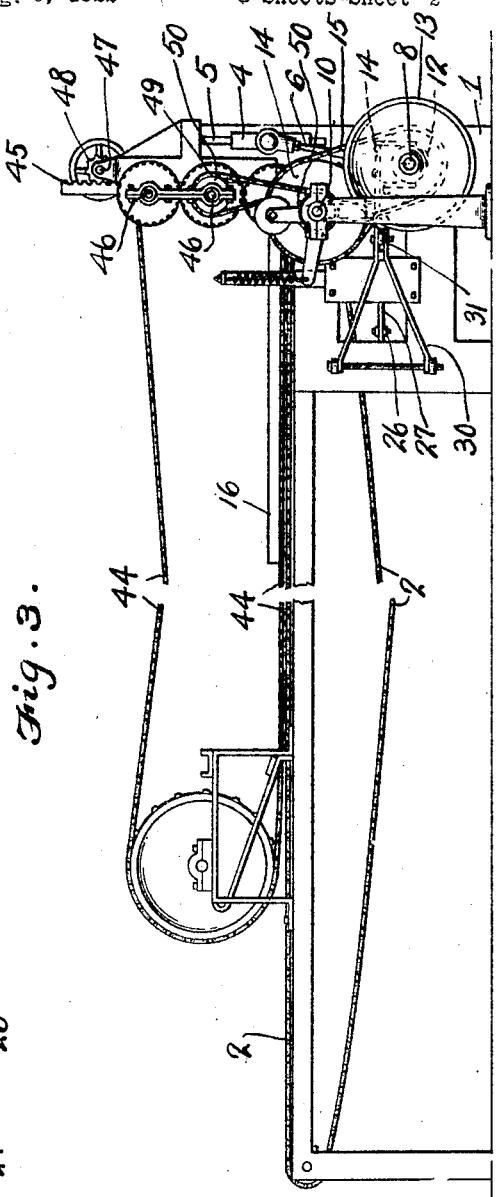
George H. Osgood INVENTOR

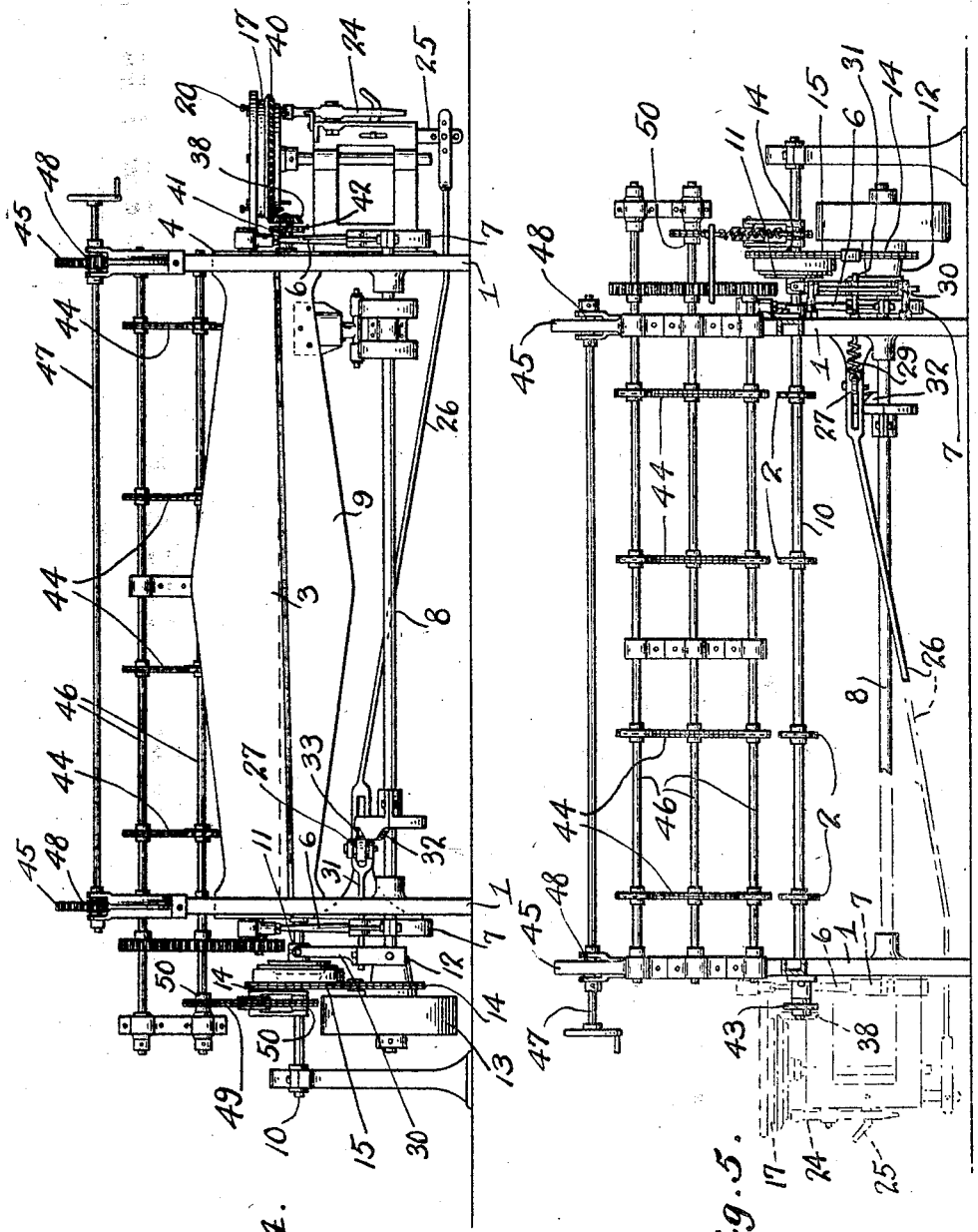

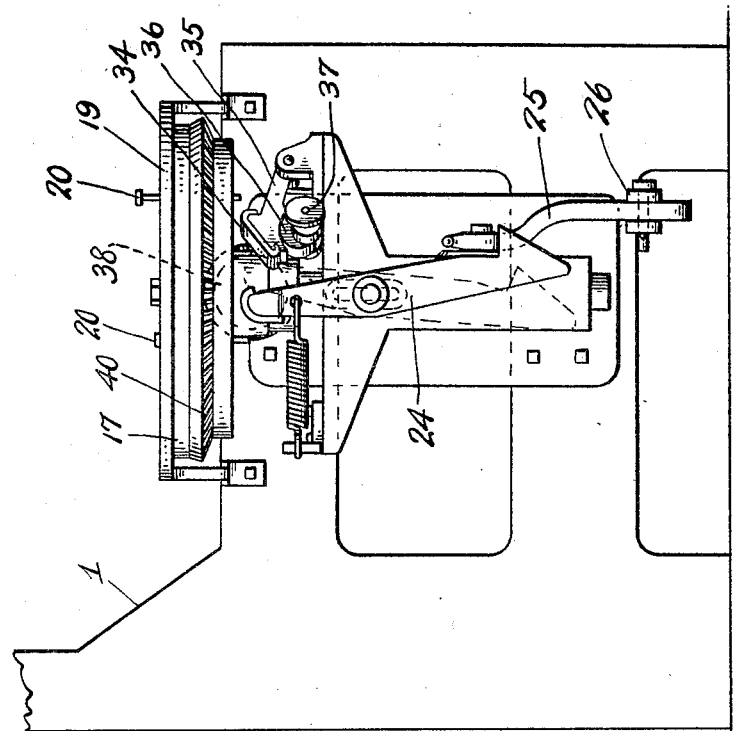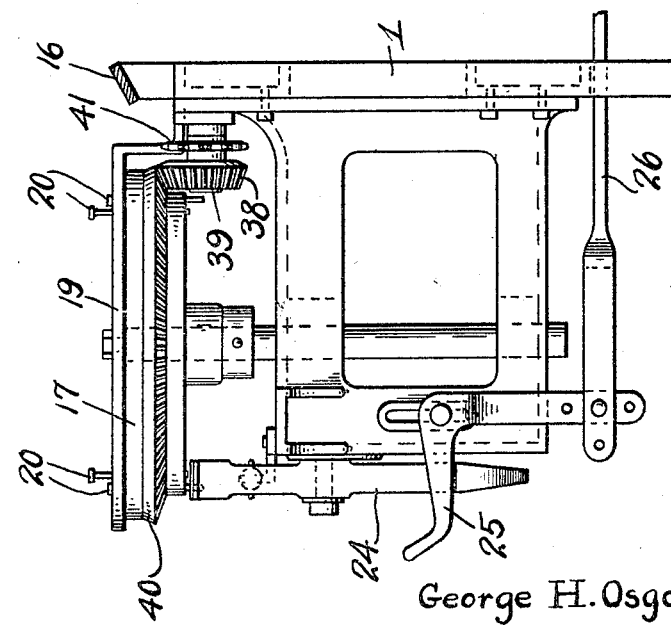

Feb. 17. 1925.
G. H. OSGOOD
VENEER CLIPPER
Filed Aug. 5, 1922
1,527,064
8 Sheets-Sheet 5
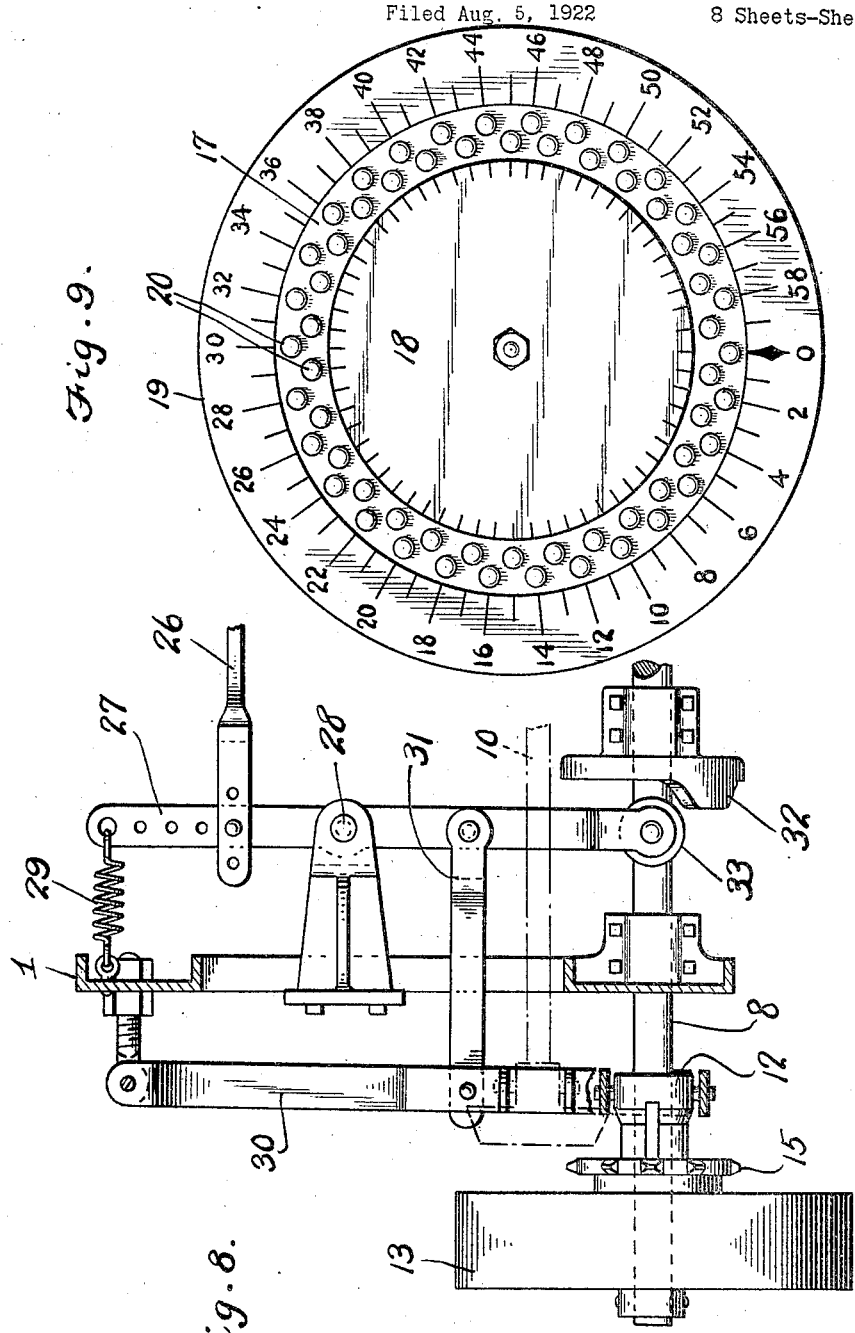
George H. Osgood, INVENTOR
BY Victor J. Evans
L. B. James.
WITNESS:
ATTORNEY Feb. 17. 1925.
G. H. OSGOOD
VENEER CLIPPER
Filed Aug. 5, 1922
1,527,064
8 Sheets-Sheet 6
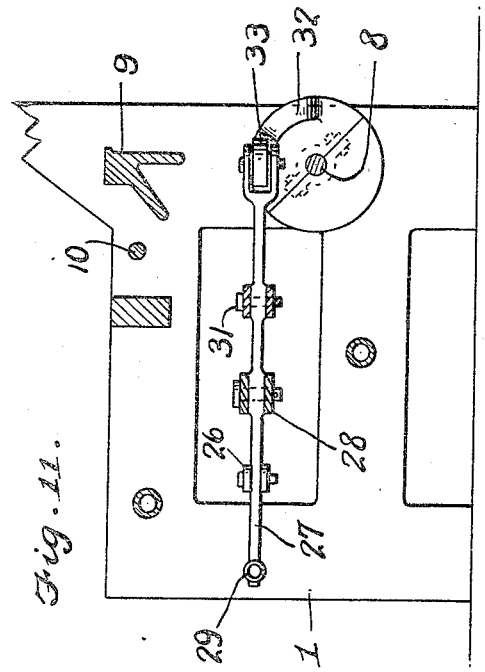
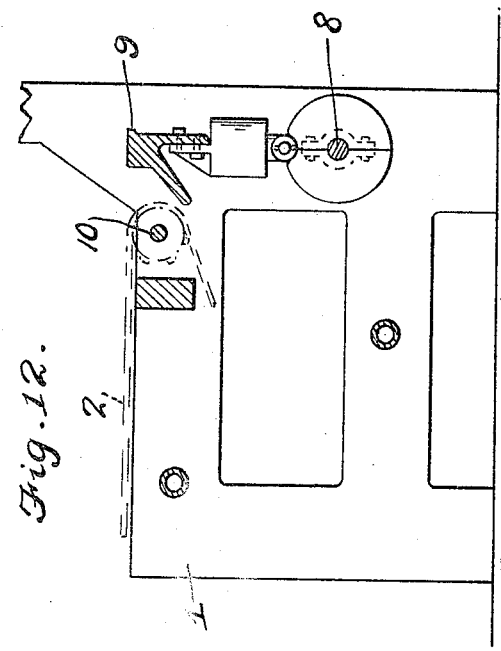
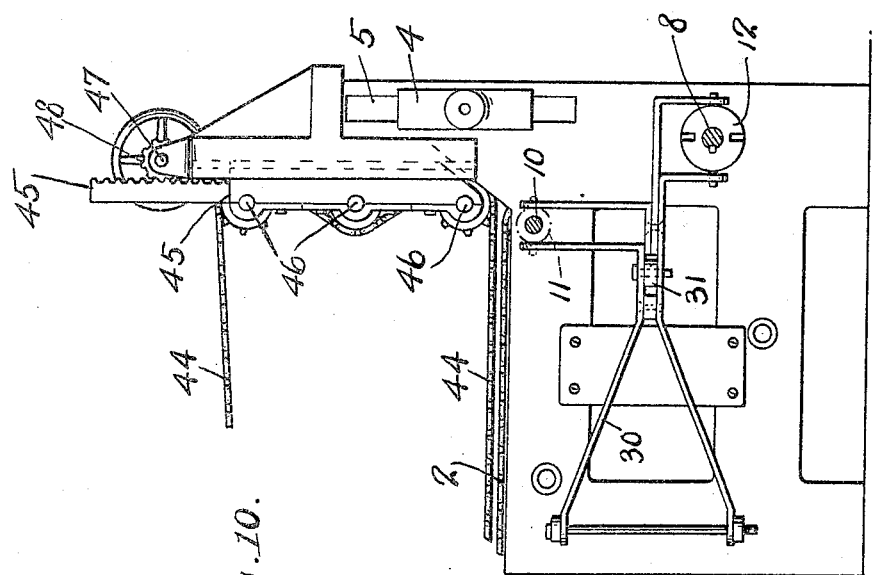
George H. Osgood INVENTOR
BY Victor J. Evans ATTORNEY
WITNESS: L. B. James

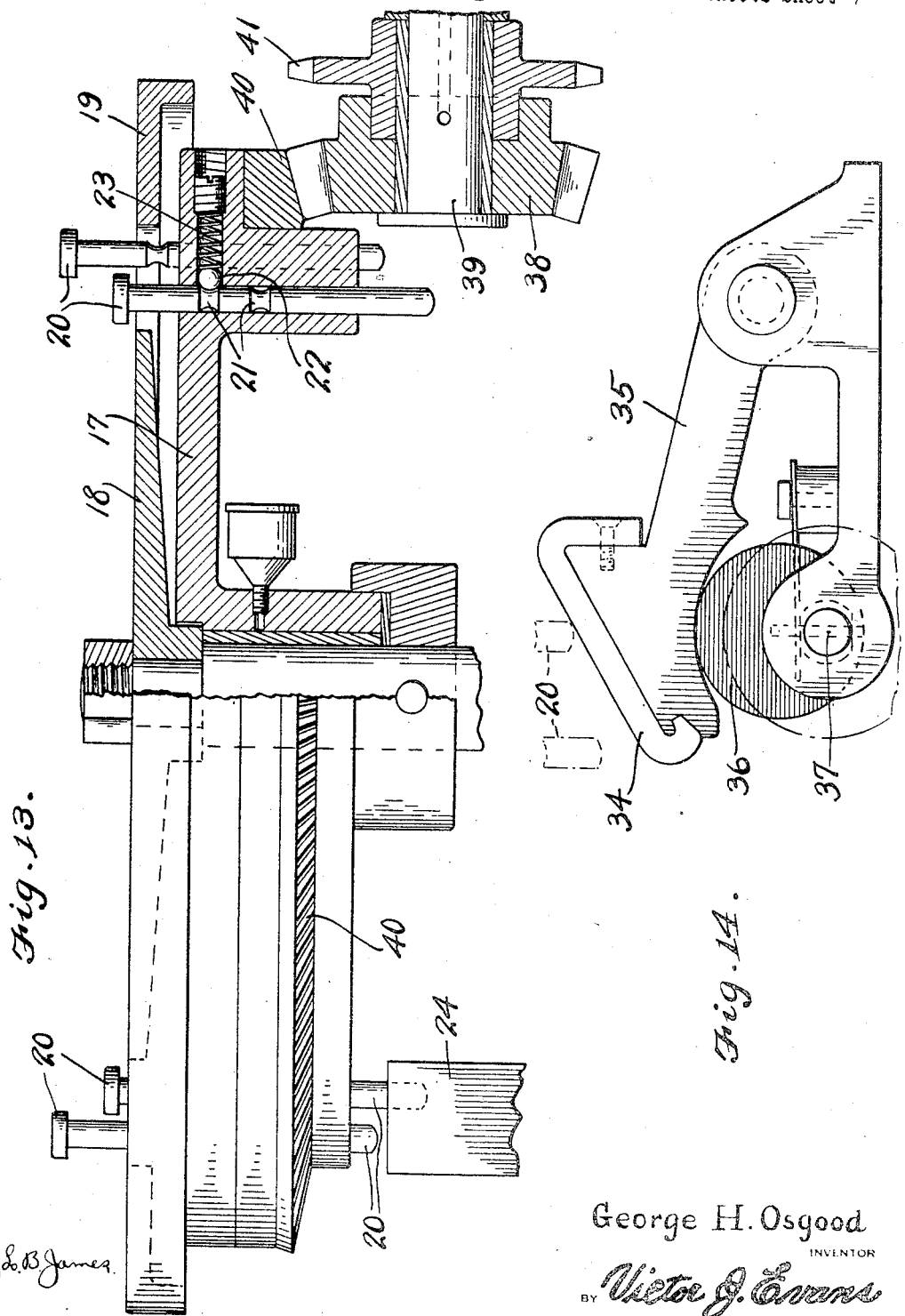

Feb. 17. 1925.
G. H. OSGOOD
VENEER CLIPPER
Filed Aug. 5, 1922
1,527,064
8 Sheets-Sheet 8
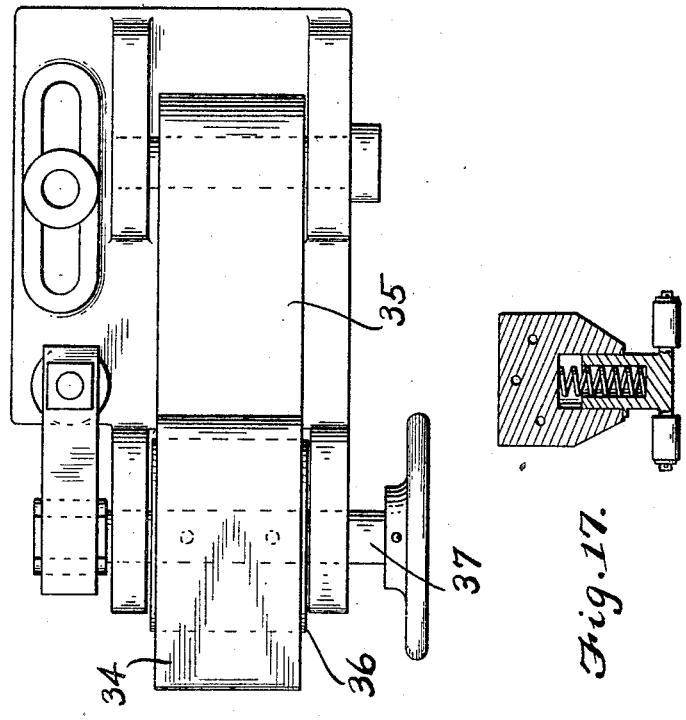
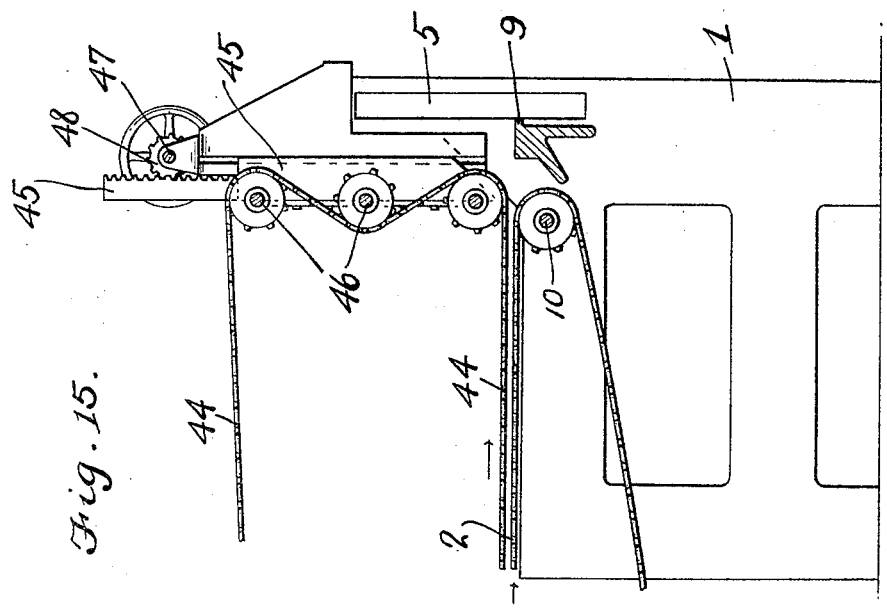
WITNESS:
L. B. James.
George H. Osgood INVENTOR
BY Victor J. Evans
ATTORNEY Patented Feb. 17, 1925.

1,527,064

UNITED STATES PATENT OFFICE.

GEORGE H. OSGOOD, OF TACOMA, WASHINGTON.

VENEER CLIPPER.

Application filed August 5, 1922. Serial No. 579,971.

*To all whom it may concern:*

Be it known that I, GEORGE H. OSGOOD, a citizen of the United States, residing at Tacoma, in the county of Pierce and State of Washington, have invented new and useful Improvements in Veneer Clippers, of which the following is a specification.

This invention relates to improvements in veneer clippers, the general object of the invention being to provide means for controlling the movements of the conveyor and the knife so that the conveyor will be stopped and a knife actuated after a certain amount of movement of the conveyor.

Another object of the invention is to provide key mechanism and scales whereby the conveyor can be stopped at any desired point to bring the part of the veneer which is to be clipped under the knife, after which the knife will be actuated to clip the veneer.

Another object of the invention is to provide upper and lower feeding devices, the upper one of which is adjustable towards and away from the lower one and both of which are driven in unison.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of a clipper with my invention applied thereto.

Figure 2 is an elevation of the left hand side.

Figure 3 is an elevation of the right hand side.

Figure 4 is a front view.

Figure 5 is a rear view.

Figure 6 is an enlarged side view of the drum and its associated parts.

Figure 7 is a front view of Figure 6.

Figure 8 is an enlarged view of the clutch means.

Figure 9 is an enlarged plan view of the drum.

Figure 10 is a view of the left hand end of the front part of the frame of the apparatus with several of the shafts in section.

Figure 11 is a sectional view through the front part of the frame of the apparatus and showing the cam operated lever for returning the parts.

Figure 12 is a similar view but taken adjacent the means for operating the knife bar from its operating shaft.

Figure 13 is an enlarged elevation with parts in section of the drum and its associated parts.

Figure 14 is a view of the plunger raising means.

Figure 15 is a sectional view through the front part of the apparatus showing the means for adjusting the upper conveyor.

Figure 16 is a plan view of the plunger raising means.

Figure 17 is a sectional view showing the yieldable connection between the knife bar and its operating member.

In these views 1 indicates the frame of the device which supports the lower conveyor 2 which feeds the veneer to the knife 3 which is vertically movable at one end of the table by having its ends connected to the sliding members 4 which operate in the guideways 5 and which are connected by the rods 6 with the eccentrics 7 located on the shaft 8. A cutting bar 9 is arranged below the path of the veneer and cooperates with the knife to clip the veneer. The drive shaft 10 for the conveyor is provided with a clutch 11 and the knife shaft 8 is provided with a clutch 12 so that these shafts can be connected to and disconnected from the driving means, which are shown as consisting of a pulley 13 and the sprockets 14 and chain 15, one sprocket being connected with the pulley and the other loosely mounted on the shaft 10 so that it can be connected and disconnected with said shaft by the clutch 11. The other sprocket and pulley being connected to and disconnected from the knife shaft by the clutch 12. This clutch 12 may be provided with a suitable lever for operating it. The foregoing arrangement of parts is of well known construction and forms no part of my invention.

As is well known, the veneer as it comes from the lathe will have flaws in its surface, such as knots and the like, which must be eliminated and this is done by cutting the imperfect parts from the sheet by the clippers or knives. It is necessary to stop the conveyor when the part to be cut is adjacent the knife and considerable time is consumed in stopping the conveyor and actuating the knife to cut the imperfect parts from the sheet.

It is the object of my invention to save the time now wasted without wasting any more material than is now done under the best possible operation of the machine. When the veneer is being cut the operator can see the imperfections in the part on the conveyor so that he can estimate just where the next cut is to be made and in order that he can measure exactly just how far the conveyor must move to bring the part of the veneer to be cut to the knife I arrange a rule or scale 16 on the table or frame, at one side thereof. I also provide means for automatically stopping the conveyor and operating the knife when the conveyor has moved the desired extent to bring the part of the veneer to be cut under the knife.

Such means consists of a drum 17 with which is associated the inner dial 18 and the outer dial 19, the indications of which correspond with those on the scale 16. The drum carries a plurality of keys or plungers 20, one for each indication mark. These keys or plungers are each provided with a pair of annular grooves 21 which are spaced apart, as shown, and are adapted to receive a ball 22 located in the recess in the drum and under the pressure of a spring 23. This ball and spring will hold the plunger in its raised position when engaging the lower grooves and in its lowered position when engaging the upper groove. When in its lower position the lower end of the plunger, when brought around the zero point on the dials, by the rotation of the drum, will strike the spring controlled latch member 24 and cause it to release the bell crank 25 which is connected by the link 26 with a lever 27, fulcrumed at 28, and actuated by a spring 29 to shift the clutch lever 30, to which it is connected by the link 31, to move the clutch 11 into inoperative position and the clutch 12 into operative position. This will stop the movement of the conveyor and start the rotation of the knife shaft so that the eccentrics will act to draw the knife downwardly to clip the veneer and then return the knife to its normal position. Just before the knife reaches its normal position a cam 32 on the knife shaft strikes a roller 33 on lever 27 to return the parts to the first position and thus permit the latch member 24 to again seize the bell crank 25 and thus hold the parts with the clutch 11 in operative position and the clutch 12 in inoperative position so that the conveyor will be in operation and the knife out of operation.

From the above it will be seen that when the conveyor is at rest the operator can tell, by means of the scale 16, just how many inches the conveyor must travel to bring the next imperfect part of the veneer under the knife. Then by depressing the key or plunger on the drum which is opposite the same indication as that on the scale the parts will be actuated at the proper time to stop the conveyor and make the cut.

The plunger can be raised again by means of the inclined shoe 34 on the arm 35 which is pivoted to a part of the frame under the drum and this shoe can be thrown into inoperative position, where it will not strike the plunger, by means of the eccentric 36 which is located on a shaft 37 suitably mounted in the frame. Thus the plungers can be raised, after performing their work, in the further rotation of the drum or they may be left in their lowered position, as desired. The drum is rotated by means of a pinion 38 on shaft 39 engaging the rack 40 on the drum, shaft 39 carrying the sprocket 41 which is connected by the chain 42 with a sprocket 43 on the shaft that drives the conveyor.

The upper conveyor 44 is arranged above the lower conveyor so that the veneer will be held between the chains of the upper and lower conveyors and said upper conveyor is adjustable towards and away from the lower conveyor by means of the rack bars 45 which support sprocket shafts 46 for the front end of the conveyor and which are adjusted vertically in the frame by means of the manually operated shaft 47 to which the toothed wheels 48 are secured which engage the racks. The central shaft 46 is driven from the shaft which drives the lower conveyor to the sprockets and chains 49 and this central shaft is secured to the shafts by the gears 50.

From the above it will be seen that the upper conveyor is driven in unison with the lower conveyor and it can be raised and lowered in relation to the lower conveyor to permit different thicknesses of veneer to be fed.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a veneer clipper including a conveyor and a knife, key operated means for stopping the conveyor to bring any desired part of the strip of veneer under the knife and actuating the knife to cut the strip and then raising the knife and starting the conveyor again after the cut has been made.

2. In a veneer clipper including a conveyor, its clutch, a knife, a knife shaft and a clutch therefor, key operated means for stopping the conveyor and actuating the knife to bring any desired part of the strip of veneer under the knife, and then starting the conveyor again after the cut has been made, such means including a spring controlled clutch actuating device for moving the conveyor clutch into inoperative position and the knife shaft clutch into operative position, a latch member for holding the clutch actuating device against the action of its spring, a movable element, keys carried thereby and arranged to release the latch member when depressed.

3. In a veneer clipper including a conveyor, its clutch, a knife, a knife shaft and a clutch therefor, key operated means for stopping the conveyor and actuating the knife to bring any desired part of the strip of veneer under the knife, and then starting the conveyor again after the cut has been made, such means including a spring controlled clutch actuating device for moving the conveyor clutch into inoperative position and the knife shaft clutch into operative position, a latch member for holding the clutch actuating device against the action of its spring, a movable element, keys carried thereby and arranged to release the latch member when depressed, a scale adjacent the conveyor and indicating marks adjacent the keys corresponding to those on the scale.

4. In a veneer clipper including a conveyor shaft and its clutch, and a knife shaft and its clutch, a spring controlled clutch operating member for moving the clutch of the conveyor shaft into inoperative position and the clutch of the knife shaft into operative position, a latch member connected with the first mentioned member for holding the same against the action of its spring, a drum, means for rotating the same from the conveyor shaft, plungers carried by the drum and arranged when depressed to strike the latch member to cause the same to permit the spring to move the clutch operating member and a cam on the knife shaft for moving the clutch operating member into its normal position to permit the latch member to lock the same in this position.

5. In a veneer clipper including a conveyor, its shaft and a clutch on the shaft, a knife shaft and its clutch, a clutch operating member, a spring for moving the same to shift the conveyor clutch into inoperative position and the knife shaft clutch into operative position, a latch member for holding the first mentioned member against movement by its spring, a drum, key plungers thereon arranged to strike the latch member to move the same into releasing position, a dial associated with the keys on the drum, a scale adjacent the conveyor having indications thereon similar to those on the dial, means for rotating the drum from the conveyor shaft and means for holding the key plungers in their upper and lower positions.

6. In a veneer clipper including a conveyor, its shaft and a clutch on the shaft, a knife shaft and its clutch, a clutch operating member, a spring for moving the same to shift the conveyor clutch into inoperative position and the knife shaft clutch into operative position, a latch member for holding the first mentioned member against movement by its spring, a drum, key plungers thereon arranged to strike the latch member to move the same into releasing position, a dial associated with the keys on the drum, a scale adjacent the conveyor having indications thereon similar to those on the dial, means for rotating the drum from the conveyor shaft, means for holding the key plungers in their upper and lower positions and means for raising the key plungers into raised position after they engage the latch member.

7. In a veneer clipper including a conveyor, its shaft and a clutch on the shaft, a knife shaft and its clutch, a clutch operating member, a spring for moving the same to shift the conveyor clutch into inoperative position and the knife shaft clutch into operative position, a latch member for holding the first-mentioned member against movement by its spring, a drum, key plungers thereon arranged to strike the latch member to move the same into releasing position, a dial associated with the keys on the drum, a scale adjacent the conveyor having indications thereon similar to those on the dial, means for rotating the drum from the conveyor shaft, means for holding the key plungers in their upper and lower positions, means for raising the key plungers into raised position after they engage the latch member, and means for moving the last-mentioned means into inactive position when desired.

8. In a veneer clipper, a lower conveyor, an upper conveyor associated with the lower conveyor, means for moving the upper conveyor in unison with the lower conveyor, means for adjusting the upper conveyor towards and away from the lower conveyor, such means consisting of rack-bars supporting one end of the upper conveyor, a manually operated shaft and toothed wheels thereon engaging the rack-bars.

In testimony whereof I affix my signature.

GEORGE H. OSGOOD.